United States Patent

Wilson

[15] 3,642,401

[45] Feb. 15, 1972

[54] MOLDING MACHINE MONITORING SYSTEM

[72] Inventor: Warren Thomas Wilson, Saugus, Mass.
[73] Assignee: The Gillette Company, Boston, Mass.
[22] Filed: July 15, 1969
[21] Appl. No.: 841,885

[52] U.S. Cl. ..........................425/137, 18/2 HA, 18/16 C, 90/13.99, 425/145, 425/167, 425/173
[51] Int. Cl. .........................................B29f 1/00, B30b 15/28
[58] Field of Search..................18/2 HA, 16 C, 17 W, 17 K, 18/30 CM, 30 CS; 90/13.99

[56] References Cited

UNITED STATES PATENTS

| | | | |
|---|---|---|---|
| 3,105,907 | 10/1963 | Colten et al. | 90/13.99 |
| 3,222,724 | 12/1965 | Soderquist | 18/17 W |
| 3,303,537 | 2/1967 | Mislan | 18/160 C X |
| 3,341,888 | 9/1967 | Bridge et al. | 18/2 HA |
| 3,487,507 | 1/1970 | Turk | 18/17 K |
| 3,525,382 | 8/1970 | Devol | 18/16 C X |

Primary Examiner—J. Howard Flint, Jr.
Attorney—Willis M. Ertman

[57] ABSTRACT

A monitoring system for detecting molded material in molding machines with two platens, one of which has a plurality of die recesses and the other of which is removable from the first, has an array of photoelectric cells, each corresponding to a die recess, arranged to sense the condition of one of the recesses when the platens are separated and having different outputs corresponding to differences in conditions of the recesses, and has a switch arranged to prevent operation of the machine if the cells indicate the presence of molded material in any of the die recesses when the platens are separated. A television camera transmits an image of the recesses to a television receiver and the sensors are mounted on the screen of the receiver.

4 Claims, 4 Drawing Figures

PATENTED FEB 15 1972 3,642,401

MOLDING MACHINE MONITORING SYSTEM

This invention relates to a scanning system for injection molding machines and, more particularly, to a system for controlling the operation of a molding machine in response to the condition of the mold.

In molding machines of the type to which the invention relates the die mold includes a cavity portion disposed on a stationary platen and a cooperating cover portion mounted on a movable platen. In the molding process, after the movable platen is placed in sealing engagement against the stationary platen, molten thermoplastic material is injected into the cavity of the mold and allowed to cool and harden. The movable platen is then moved away from the stationary platen and carries with it the hardened molded material which is removed therefrom for subsequent steps in the manufacturing process by suitable means, such as ejection rods, mounted within the movable platen, which automatically propel the molded material from the movable platen when it has moved a predetermined distance from the stationary platen.

Occasionally a portion of the thermoplastic material injected into the cavity remains therein after the movable platen has been moved away from the stationary platen. If a second molding operation is performed while this previously hardened material remains in the cavity, the pressure resulting from the second injection of thermoplastic material will cause the mold to burst. Consequently, the condition of the cavity must be observed and if plastic remains therein it must be removed—between successive operations of the molding machine. Conventionally, a human attendant is required beside each machine to observe the condition of the cavity, to remove molded material, if necessary, and then to restart the machine cycle.

Accordingly, it is an object of the present invention to provide a system which automatically, efficiently, and reliably monitors the condition of the die cavity between successive molding operations without requiring a human attendant beside each machine.

Another object of the invention is to provide for such a system with apparatus that is simple and inexpensive, automatically permits successive operations when the cavity remains free from plastic residue, and automatically stops operation when plastic is left behind in the cavity.

A further object of the invention is to provide such a system which observes a number of cavities in a single molding machine die in greater detail and more rapidly than is possible with the human eye or existing devices and may be employed to record the location of those cavities in which plastic remains most frequently.

A still further object of the invention is to provide a scanning system which permits observation of a large number of cavities in many molding machines, while requiring only one attendant to supervise the machines and remove plastic which remains on a die surface after molding and then to restart the molding machine.

According to the invention a monitoring system for detecting molded material in molding machines with two platens, relatively movable between a first position in which a die cavity for receiving material to be molded is formed and a second position in which the platens should carry no molded material, one of the platens having a plurality of die recesses each with a first condition in which the cavity is free from molded material and a second condition in which the recesses have molded material disposed therein, has an array of sensors, each corresponding to a die recess, arranged to sense the condition of one of the recesses when the platens are in the second position and having first and second outputs corresponding, respectively, to the first and second conditions, and has means responsive to the second outputs to signal the presence of the molded material in any of the recesses.

In a preferred embodiment the system also has structure arranged to prevent operation of the machine after the means signals the presence of molded material in any of the die recesses when the platens are in the second position and has means for releasing the structure to permit the machine to operate after the molded material has been removed from all of the recesses. The system includes a television camera arranged to transmit signals representative of the respective condition of each of the die recesses and a television monitor arranged to receive the signals and to convert the signals to an image of the recesses on the screen of the monitor. Each of the sensors is a cadmium sulfide photocell mounted adjacent to the image of the corresponding recess on the screen, arranged to discriminate between a first image of the recess when it is free of molded material and a second image of the recess when it has molded material disposed therein, and having first and second outputs respectively corresponding to the first and second images for each recess. The means responsive to the second outputs is an electrical circuit with first, second, and third switches, first, second, and third indicating lamps, and an alarm. The structure arranged to prevent operation of the machine is the first switch when it is open, the means for releasing the structure is the circuit, the circuit is arranged to open the switch when at least one of the photocells has a second output to close the switch when all of the photocells have a first output. The circuit is arranged to energize the alarm when at least one of the photocells has a second output and the second switch is arranged to deenergize the alarm and to return the first switch to the closed position when all of the photocells have their first output. The system includes at least one additional photocell arranged to energize the circuit to open the first switch when the screen of the television monitor is deenergized. The circuit has a photorelay arranged to be energized and to energize the alarm and open the first switch when one of the photocells has its second output and the third switch is arranged to deenergize the photorelay when the third switch is in the open position and to energize the photorelay when the third switch is in the closed position and at least one of the photocells has its second output. The third switch is arranged to be in the open position when the platens are in their first position and to be in the closed position when the platens are in their second position. The first indicating lamp is arranged to be energized when the additional photocell has a second output, the second indicating lamp is arranged to be energized when at least one of the other photocells has a second output, and the third indicating lamp is arranged to be energized when the alarm is energized.

The system permits efficient supervision of a number of machines by one attendant with greater reliability than human observation of an individual platen, reduces the time lag required between successive operations, and provides sufficient discrimination to monitor the condition of a large number of individual recesses.

Other objects, features, and advantages will become apparent from the following description of a preferred embodiment of the invention, taken together with the attached drawings thereof, in which.

Figure 1:
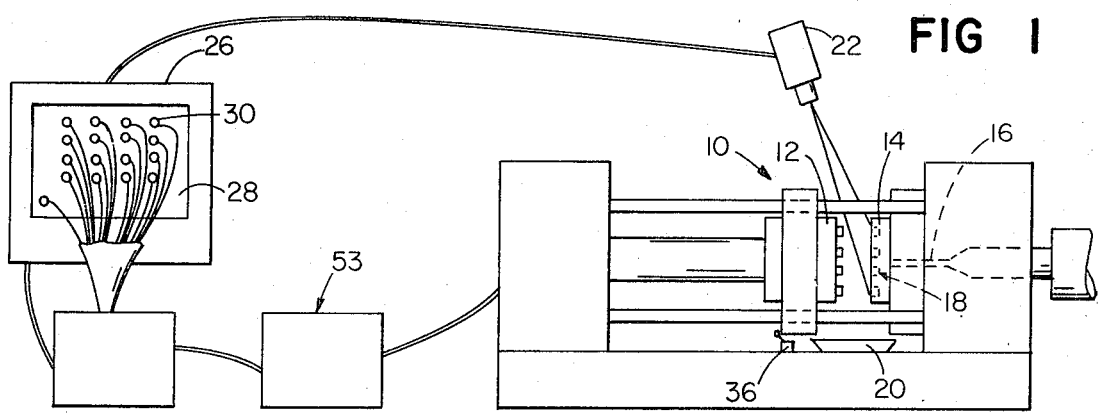
FIG. 1 is a front elevational view of a scanning device, according to the invention, and an injection molding machine, the die cavity of which is observed.

There is shown in FIG. 1 an injection molding machine 10 having a movable metal platen 12 arranged to be moved into mating engagement against stationary metal platen 14 and is arranged to receive molten thermoplastic material through conduit 16. Platens 12 and 14 are arranged to define 16 die cavities, generally designated 18, when they are in engagement and to cool the thermoplastic material in the manner that it hardens in the shape of the mold. Movable platen 12 is further arranged to be withdrawn and carry the molded plastic from platen 14 after the plastic hardens and is provided with rods (not shown) for automatically ejecting the molded plastic from the face of platen 14 into trough 20, which communicates to a device, such as a conveyor belt, which carries the molded plastic structures to other machinery used in the manufacturing process.

Television camera 22 is arranged to observe the recesses 24 in platen 14 after platen 12 has been withdrawn therefrom by a predetermined distance (to be discussed more fully below) and to transmit the image to television receiver 26 upon the screen 28 of which are mounted 17 cadmium sulfide photocells 30, 16 of which arranged to detect the image of plastic material, if any, remaining in recesses 24 after platen 12 has been withdrawn and to change an electrical characteristic in response thereto in the manner that an alarm will sound and the molding machine will discontinue operation until the plastic is removed and the machine is reset.

Figure 3:
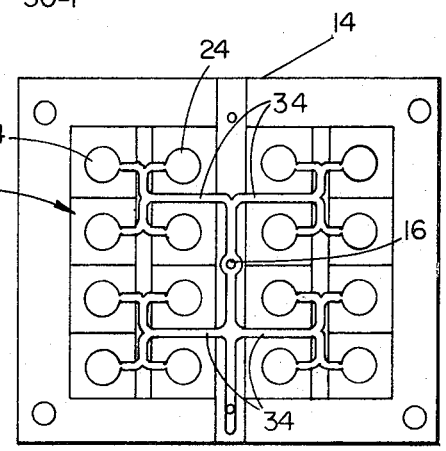
FIG. 3 is a front elevation of the stationary platen of FIG. 1.

Referring to FIG. 3, platen 14 has 16 separate recesses 24 into which molten thermoplastic material is injected through conduit 16 and runners 34, each runner feeding four recesses 24. One each of 16 photocells, 30–1 to 30–16, observes the image of the corresponding recesses 24, while the seventeenth photocell, 30–17, observes the raster of screen 28.

Figure 4:
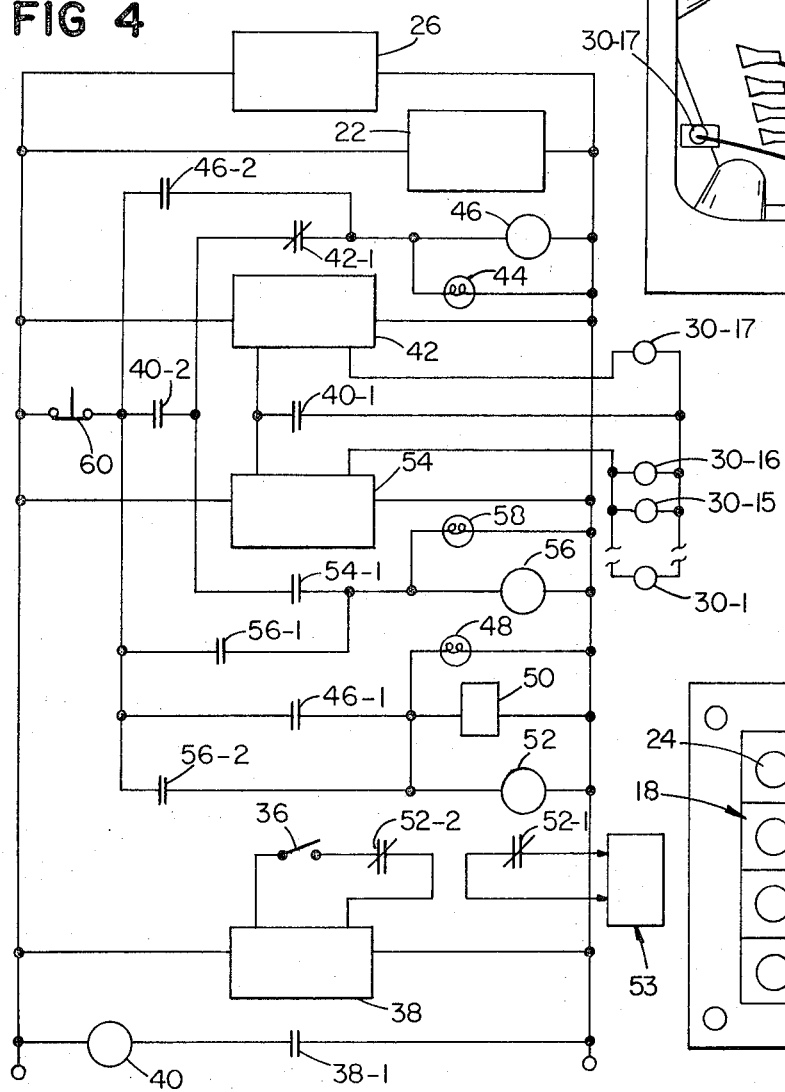
FIG. 4 is a schematic wiring diagram of the circuitry of the scanning device of FIG. 1.
Figure 2:
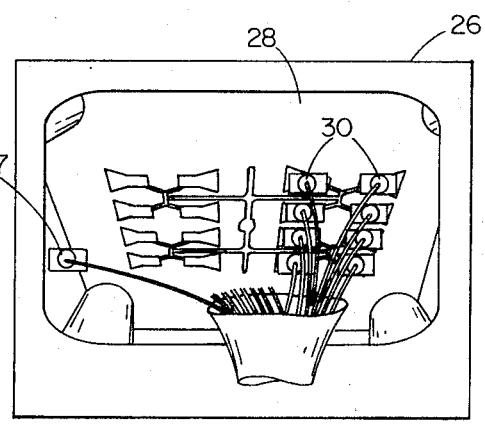
FIG. 2 is a front elevation, partly broken away, showing the television receiver and photocells of FIG. 1 in greater detail.

The detailed electrical circuitry corresponding to the apparatus of FIGS. 1–3 is shown in FIG. 4 and is connected for operation with a common 110-volt AC source. Camera 22 and receiver 26 are continuously energized and limit switch 36, which closes when platen 12 moves a predetermined distance from platen 14, is arranged to energize time delay relay 38, which after a 5-second delay, closes normally open contact 38–1 to energize the control relay 40. Photo relay 42 is connected in series with photocell 30–17 and normally open contact 40–1 of relay 40, becomes energized after relay 40 has been energized when photocell 30–17 detects the raster on screen 28 and opens normally closed contact 42–1. Indicating light 44 is connected in series with contact 42–1 and normally open contact 40–2 of relay 40 and is energized if the receiver is turned off or there is no image on the screen for some other reason. Control relay 46 is energized if relay 42 remains deenergized and contact 40–2 is closed, and closes normally open contact 46–1, to energize alarm light 48, alarm bell 50, and control relay 52, and normally open holding contact 46–2. Relay 52 has normally closed contact 52–1 connected in the control circuit 53 of the molding machine in the manner to shut down the machine when contact 52–1 is open and has normally closed contact 52–2 connected in series with relay 38. Photorelay 54 is connected in series with contact 40–1 and is energized when one or more of photocells 30–1 through 30–16 detect plastic in one or more of recesses 24 and closes normally open contact 54–1 to energize control relay 56 and indicating light 58. Relay 56 has normally open holding contacts 56–1 and contacts 56–2 arranged to energize alarm light 48, alarm bell 50 and relay 52 upon energization of relay 54. Reset button 60 is provided to deenergize all relays, indicating lights and the alarm and to return the circuit to its initial position after the condition which caused the machine to be shut down has been corrected by an attendant.

In operation, platen 12 is moved into engagement against platen 14 and molten thermoplastic is injected through conduit 16 and runners 34 into recesses 24. When the plastic has cooled and hardened, platen 12 is moved away from platen 14 and carries the molded plastic pieces with it. The pieces are deposited in trough 20 by suitable means such as rods mounted within platen 12. When platen 12 moves a predetermined distance, it closes limit switch 36 and relay 40 is energized after the desired time delay. If there is a raster on screen 28, photocell 30–17 is energized and if no plastic remains in recesses 24 none of photocells 30–1 to 30–16 is energized. Photorelay 42 is energized and contact 42–1 opens, thereby opening the circuit to indicating lamp 44 and relay 46. Photorelay 54 remains deenergized and contact 54–1 remains open so that indicating light 58 and relay 56 remain deenergized.

Furthermore, contacts 46–1 and 56–2 remain open and lamp 48, bell 50 and relay 52 are deenergized. Therefore, when contact 38–1 closes, energizing relay 40 to close contact 40–2, contact 52–1 in control circuit 53 remains closed and the molding machine automatically begins its next molding operation.

If, however, photocell 30–17 detects the absence of a raster, photorelay 42 remains deenergized, and contact 42–1 remains closed. When contact 40–2 closes after the time delay, indicating lamp 44 and relay 46 become energized and contacts 46–1, –2 close. Contact 46–2 holds relay 46 and lamp 44 in an energized state, while lamp 48, bell 50 and relay 52 are energized through contact 46–1. Contact 52–1 opens and the machine is shut down. The molding machine remains inoperative until an attendant, after observing alarm light 48 or hearing bell 50 and observing that lamp 44 is energized, turns on receiver 26 and presses reset button 60 after an image appears on screen 28.

When a piece of plastic has been left in one or more of recesses 24, one or more of photocells 30–1 to 30–16 detects the plastic material and energizes photorelay 54. Contact 54–1 closes, "piece in mold" indicating lamp 58 and relay 56 are energized, and contacts 56–1 and 56–2 close to lock in lamp 58 and relay 56 and energize alarm lamp 48, bell 50, and relay 52. Contact 52–1 opens and the machine shuts down. An attendant alerted by the alarm observes that "piece in mold" lamp 58 is energized, scrapes the plastic from those recesses 24 in which it has remained, and depresses button 60 to release the circuit and resume operation.

The use of several scanning devices as disclosed above permits the simultaneous operation of a number of molding machines, while requiring the presence of a single attendant, who need only observe lights and bells rather than the complex contour of platen 14. Each device may employ additional photocells to monitor the condition of runners 34, as well as that of recesses 24, after each molding operation. In addition a recording device may be used in conjunction with the scanning device and coupled to the individual photocells in order to record the frequency of pieces of plastic remaining in individual recesses after completion of molding operations in order that the recesses where sticking occurs most frequently may be detected and appropriate remedial action taken.

While a particular embodiment of the invention has been shown and described, various modifications thereof will be apparent to those skilled in the art and therefore it is not intended that the invention be limited to the disclosed embodiment or to details thereof, and departures may be made therefrom within the spirit and scope of the invention as defined in the claims.

What is claimed is:

1. A monitoring system for detecting molded material in a molding machine having two platens, relatively movable between a first position for receiving molding material in die cavities formed between said platens and a second spaced-apart position in which said platens should carry no molded material, one of said platens including a plurality of die recesses, each recess having a first condition in which the recess is free from molded material and a second condition in which said recess has molded material disposed therein, said system comprising a television camera for sensing said one platen and providing a video signal output representative of all of said plurality of die recesses of said one platen, display means at a position spaced from said molding machine including a screen and means responsive to said video signal for providing a visual display representative of said die recesses on said screen, an array of photocells, each corresponding to a die recess and being disposed in fixed relation relative to said screen to sense the condition of the image of the corresponding recess when said platens are in said second position, and having first and second outputs corresponding, respectively, to said first and second conditions, and an electrical circuit having first switch means, said first switch means having a closed position permitting said machine to operate and an open position in which said machine does not operate, said circuit being arranged to open said first switch means when one of said photocells has a second output indicating the presence of molded material in a monitored die recess and second switch means arranged to return said first switch means to said closed position when all of said photocells have their first outputs.

2. The system according to claim 1 wherein said screen has an energized condition and a deenergized condition and said system further comprises a sensor arranged to sense the condition of said screen and having first and second outputs, respectively, corresponding to said energized and deenergized conditions of said screen, said circuit being responsive to said second output of said sensor to open said first switch means and prevent operation of said machine when said sensor has its second output.

3. The system according to claim 2 wherein said circuit further comprises a first indicating lamp arranged to be energized when said sensor has said second output, and a second indicating lamp arranged to be energized when at least one of said photocells has a second output.

4. A system according to claim 1 wherein said photocells are cadmium sulfide photocells.

* * * * *